(No Model.)
A. M. SIDWELL.
Transplanter.
No. 235,463.  Patented Dec. 14, 1880.
Fig. 1.  Fig. 2.
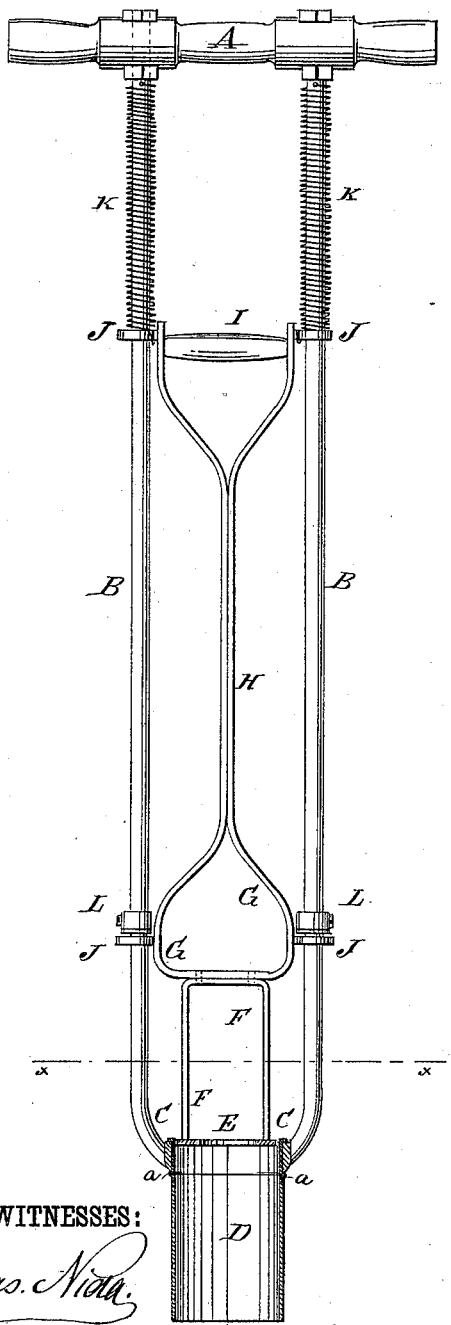
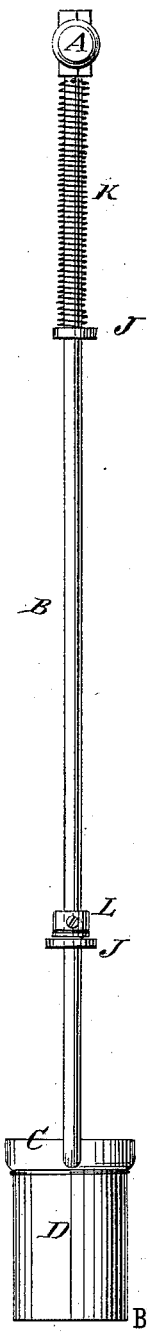
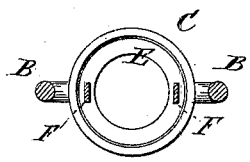
Fig. 3.
WITNESSES:
Chas. Nida.
C. Sedgwick.
INVENTOR:
A. M. Sidwell
BY Munn & Co.
ATTORNEYS.

UNITED STATES PATENT OFFICE.

AARON M. SIDWELL, OF GIRARD, KANSAS.

TRANSPLANTER.

SPECIFICATION forming part of Letters Patent No. 235,463, dated December 14, 1880.

Application filed September 29, 1880. (No model.)

*To all whom it may concern:*

Be it known that I, AARON M. SIDWELL, of Girard, in the county of Crawford and State of Kansas, have invented a new and useful Improvement in Transplanters, of which the following is a specification.

Figure 1 is a front elevation, partly in section, of the improvement. Fig. 2 is a side elevation. Fig. 3 is a sectional plan view taken through the line $x$ $x$, Fig. 1.

Similar letters of reference indicate corresponding parts.

The object of this invention is to furnish transplanters so constructed that plants can be readily removed from the ground without disturbing the soil around their roots, and holes made in the ground to receive the plants and adhering soil of exactly the shape and size of the soil raised with the plants, so that the growth of the plants will not be checked by transplanting.

The invention consists in the combination, with the band to which the parallel rods are attached, of the cylindrical cutter provided with a bead, and adapted to be passed through the band, and its upper edge bent down over the upper edge of the band; in the combination, with the parallel rods and the cylindrical cutter, of the push-ring, the yoke, and the sliding rod provided with a handle at its upper end and a stirrup at its lower end; and in the combination of the handle, the parallel rods, the cylindrical cutter, the push-ring, the yoke, the sliding rod provided with a handle at its upper end and with a stirrup at its lower end, and the spiral springs, as will be hereinafter fully described.

A represents a handle of convenient length and size, and to which are attached, by nuts or other suitable means, the upper ends of two parallel rods, B. The lower ends of the rods B are bent inward and are welded or otherwise secured to the opposite sides of the ring or band C, that receives the cutter D. The cutter D is made of sheet-steel, Russia sheet-iron, or other suitable material, in tubular form, two and three-fourths inches in diameter by three and one-fourth inches in length, or in that proportion for larger or smaller sizes.

The cutter D fits into the band C, and has a bead, $a$, formed around it to rest against the lower edge of the said band, and in such a position that the upper edge of the cutter will project above the upper edge of the band about one-eighth of an inch. The cutter D is passed into the band C from the lower side, and its upper edge is turned down over the upper edge of the said band. With this construction the cutter D, when bent, broken, or worn, can be detached and replaced by a new one at trifling cost.

E is a ring, about one-fourth of an inch wide and nearly as thick, which is fitted into the interior of the cutter D, and is attached to the ends of rods F. The rods F are made of a length equal to the length of the cutter D, and their upper ends are attached to the stirrup G upon the lower end of a rod, H, which passes up between the rods B, and to its upper end is attached a handle, I. To the rod H, at the ends of the handle I and at the sides of the stirrup G, are attached guide eyes or rings J, to receive and slide upon the rods B. To the upper guide-eyes, J, are attached the lower ends of spiral springs K, which are placed upon the upper parts of the rods B, and the upper ends of which are attached to the upper ends of the said rods B or to the handle A.

The upward movement of the ring E is limited, to prevent it from being drawn out of the cutter D, and stop it at the upper end of the said cutter by collars or other stops L, placed upon the rods B and secured in place by set-screws or other suitable means.

In using the transplanter, the cutter D is placed over the plant to be transplanted, and is forced into the ground by pressing down upon the handle A. The implement is then turned forward and back a few times, to loosen the outer surface of the cutter D from the surrounding soil, and is then raised from the ground, bringing with it the plant and the surrounding soil in which its roots are embedded. The implement is then placed upon the ground or upon a platform, the ring E is held down upon the soil in the cutter D by placing the foot in the stirrup G, or by taking hold of the handle I, and the handle A is drawn upward, withdrawing the cutter D from the soil surrounding the plant.

In setting out the plants a hole is made in the ground with the transplanter, and the plant and the soil adhering to it are placed in the said hole.

Plants transplanted in this manner do not have their roots disturbed, so that their growth is unchecked.

Having thus fully described my invention, I claim as new and desire to secure by Letters Patent—

1. In a transplanter, the combination, with the band C, to which the rods B are attached, of the cylindrical cutter D, provided with bead a, and adapted to be passed through the band, and its upper edge bent down over the upper edge of the band, substantially as and for the purpose set forth.

2. In a transplanter, the combination, with the rods B and the cylindrical cutter D, of the ring E, the rods F, and the rod H, provided with the handle I at its upper end and the stirrup G at its lower end, with guide-eyes J, substantially as and for the purpose set forth.

3. In a transplanter, the combination of the handle A, the rods B, the cutter D, the ring E, the rods F, the rod H, the handle I, the stirrup G, the guide-eyes J, and the springs K, substantially as herein shown and described.

AARON M. SIDWELL.

Witnesses:
THOS. W. WELLS,
JAMES McMURRAY.